(12) United States Patent
Kimura et al.

(10) Patent No.: US 6,481,225 B2
(45) Date of Patent: Nov. 19, 2002

(54) AIR CONDITIONING APPARATUS FOR VEHICLE AND ITS CONTROL METHOD

(75) Inventors: Kazuya Kimura; Ken Suitou; Masaki Ota; Masanori Sonobe; Kazuki Najima; Taku Adaniya, all of Kariya (JP)

(73) Assignee: Kabushiki Kaisha Toyota Jidoshokki, Kariya (JP)

(*) Notice: Subject to any disclaimer, the term of this patent is extended or adjusted under 35 U.S.C. 154(b) by 0 days.

(21) Appl. No.: 09/925,340

(22) Filed: Aug. 9, 2001

(65) Prior Publication Data
US 2002/0020176 A1 Feb. 21, 2002

(30) Foreign Application Priority Data
Aug. 9, 2000 (JP) ........................ 2000-241296

(51) Int. Cl.[7] ................................. B60H 1/32
(52) U.S. Cl. .......................... 62/133; 62/228.5
(58) Field of Search ..................... 62/133, 228.5, 62/228.1, 228.3, 228.4, 229, 215, 208, 226, 227, 230, 243, 323.1, 323.4

(56) References Cited

U.S. PATENT DOCUMENTS

| | | | | |
|---|---|---|---|---|
| 4,510,764 A | * | 4/1985 | Suzuki | 62/133 |
| 4,796,438 A | * | 1/1989 | Sato | 62/133 |
| 5,117,643 A | * | 6/1992 | Sakurai et al. | 62/228.5 X |
| 5,257,507 A | * | 11/1993 | Taguchi | 62/228.5 X |
| 5,893,272 A | * | 4/1999 | Hanselmann et al. | 62/133 |
| 5,924,296 A | * | 7/1999 | Takano et al. | 62/228.3 X |

FOREIGN PATENT DOCUMENTS

| | | | | |
|---|---|---|---|---|
| JP | 6-241086 | 8/1994 | | F02D/41/08 |
| JP | 1 004 770 A2 | 5/2000 | | F04B/27/18 |

* cited by examiner

Primary Examiner—Harry B. Tanner
(74) Attorney, Agent, or Firm—Morgan & Finnegan, LLP

(57) ABSTRACT

A vehicle air conditioning apparatus includes a refrigerant circuit. The air conditioning apparatus is driven by an engine. The air conditioning apparatus includes a variable displacement compressor. An external information detector detects external information used for the air conditioning. An E/G-ECU controls the output of the power source. An A/C-ECU is connected to the E/G-ECU via a communication line. The A/C-ECU computes a target value of the displacement of the compressor based on the external information. The A/C-ECU sends the computed target value to the E/G-ECU. The E/G-ECU controls the displacement of the compressor based on the computed target value. This is capable of rapidly changing the discharge displacement in accordance with the driving condition of the engine.

11 Claims, 6 Drawing Sheets

AIR CONDITIONING APPARATUS FOR VEHICLE AND ITS CONTROL METHOD

BACKGROUND OF THE INVENTION

The present invention relates to a vehicular air conditioning system for air conditioning the passenger compartment of the vehicle.

Generally, a vehicular air conditioning system includes a controller such as a computer. The controller controls the discharge displacement of a compressor based on external information such as the temperature in the passenger compartment, a set target temperature, and so on.

The compressor is generally driven by an internal combustion engine of the vehicle. The air conditioning system must be controlled in accordance with the driving conditions of the internal combustion engine. For this reason, the controller for the engine may sometimes serve as the aforementioned controller for the air conditioner. However, when the controller for the internal combustion engine and the controller for the air conditioning are combined, the controller is burdened with the extra duty of handling the information for controlling the air conditioning system. As a result, the controller experiences difficulties in the control of the internal combustion engine. For avoiding this problem, a separate controller is provided exclusively for controlling an air conditioning system. The controller for controlling the internal combustion engine is connected to the controller for controlling the air conditioning system through a communication line.

The compressor is one of the auxiliary machines that consumes the most power, and is a large load for the internal combustion engine. For this reason, when the power of the internal combustion engine must be maximally allocated for running the vehicle, such as when the vehicle is accelerated, the discharge displacement is minimized for reducing the load on the internal combustion engine. Such control is hereinafter referred to as the "displacement limit control".

When the controller for the internal combustion engine communicates with the controller for the air conditioning to minimize the discharge displacement after determining that the displacement limit control is required, a delay occurs due to the communication speed between the controllers. During this delay, the load on the internal combustion engine by driving the compressor is not reduced. In other words, the vehicle experiences degraded acceleration performance.

Recently, it has been proposed to build an on-board network that includes a controller for the internal combustion engine, a controller for the air conditioning system and other controllers (for example, a controller such as a computer for controlling the transmission). In the on-board network, communications between the controller for the internal combustion engine and the controller for the air conditioning system are performed using a common communication line, which is shared with the other controllers. When a large amount of communication between controllers causes congestion on the communication line, a larger delay occurs from the time the controller for the internal combustion engine determines that the displacement limit control is required until the time the controller for the air conditioning system minimizes the discharge displacement of the compressor.

BRIEF SUMMARY OF THE INVENTION

It is an object of the present invention to provide a vehicular air conditioning system that is capable of rapidly changing the discharge displacement in accordance with the driving condition of an internal combustion engine.

In order to attain the above objective, the present invention provides a vehicle air conditioning apparatus including a refrigerant circuit. The air conditioning apparatus is driven by a power source of a vehicle. The air conditioning apparatus comprises a variable displacement compressor. An external information detector detects external information used for the air conditioning of the vehicle. A first controller controls the output of the power source. A second controller is connected to the first controller via a communication line. The second controller computes a target value of the displacement of the compressor based on the external information. The second controller sends the computed target value to the first controller. The first controller controls the displacement of the compressor based on the computed target value.

The present invention also provides a method for controlling a vehicle air conditioning apparatus including a refrigerant circuit. The air conditioning apparatus is driven by a power source of a vehicle. The method includes controlling the output of the power source by a first controller, computing a target value of the displacement of a variable displacement compressor based on an external information used for the air conditioning of the vehicle by a second controller connected to the first controller via a communication line, sending the computed target value from the second controller to the first controller, and controlling the displacement of the compressor based on the computed target value by the first controller.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicular air conditioning system for a vehicle according to the present invention will hereinafter be described with reference to FIGS. 1 through 4.

Figure 1:
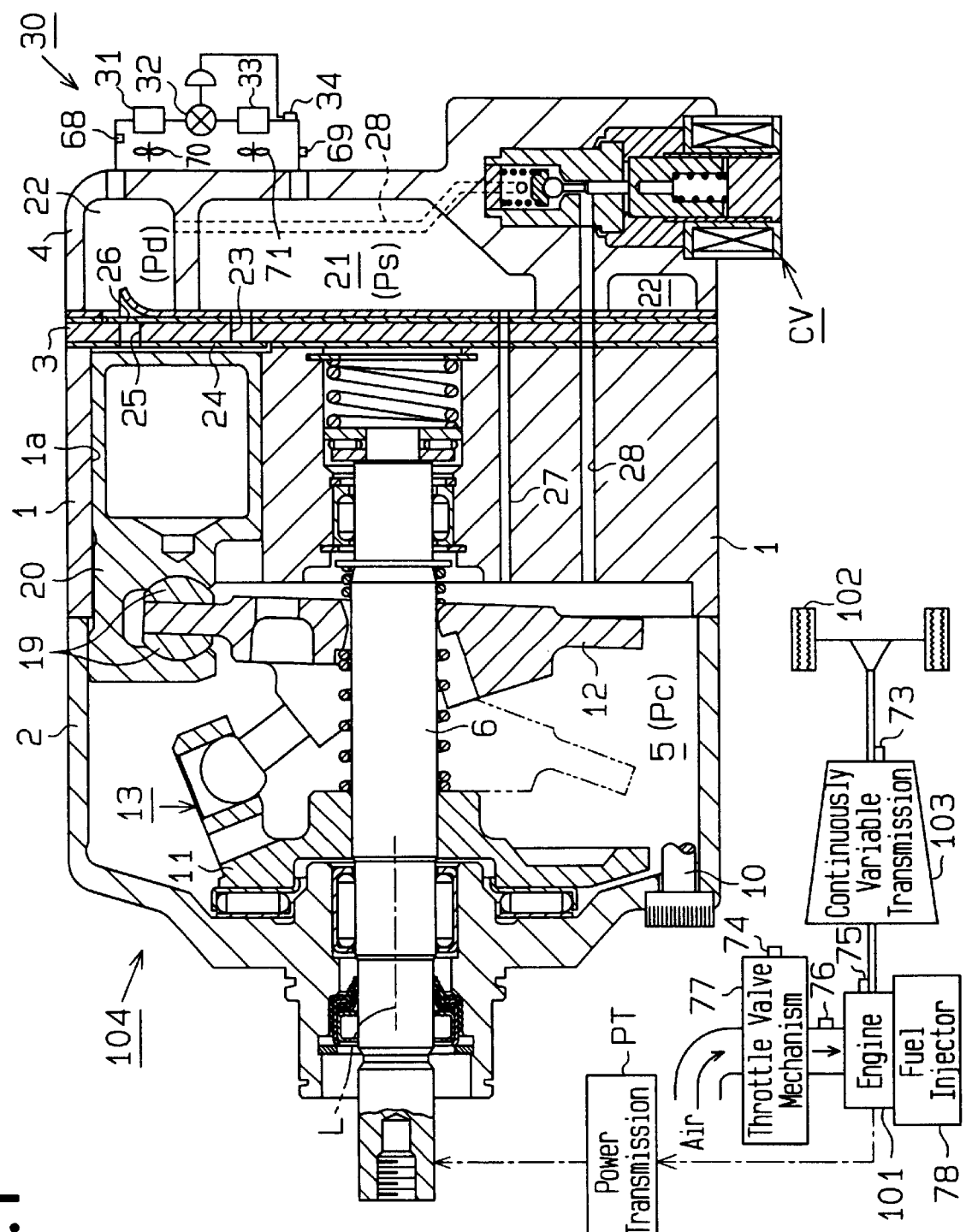
FIG. 1 shows a schematic diagram of a vehicle equipped with an air conditioner including a variable displacement compressor in a first embodiment of the present invention.
Figure 2:
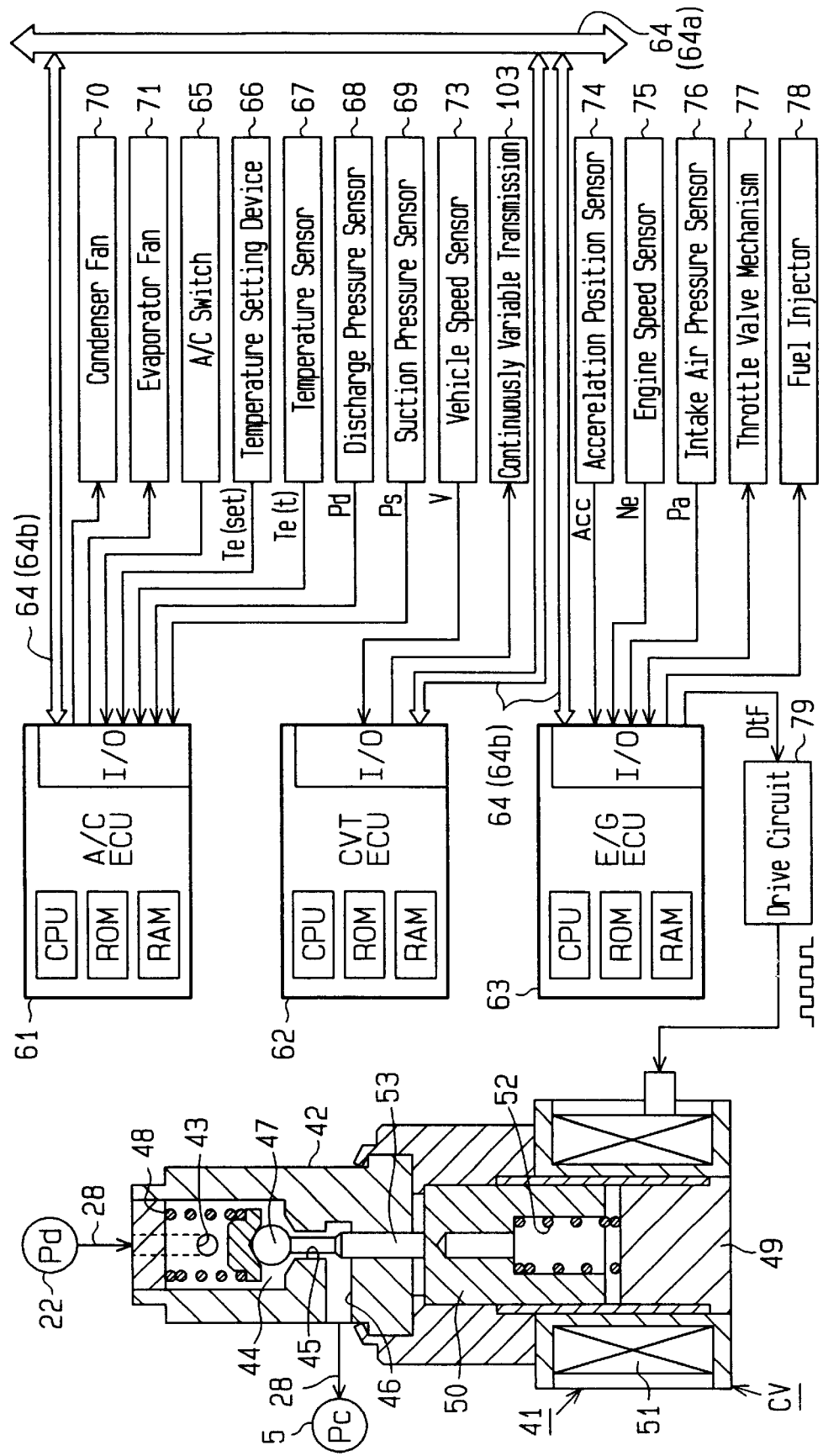
FIG. 2 shows a block diagram illustrating a control system of the vehicle.

As illustrated in FIG. 1, a continuous belt-type variable transmission 103, for example, is located on a power transmission path from an internal combustion engine 101 to a set of wheels 102. Though not shown, the continuous variable transmission 103 is coupled to a drive pulley of the internal combustion engine 101 and a driven pulley of the wheels 102 through a belt. The transmission is continuously performed by changing the effective diameters of the respective pulleys (wrapping diameters of the belt). The continuous variable transmission 103 is controlled by a controller 62 as shown in FIG. 2.

The compressor 104 shown in FIG. 1 includes a cylinder block 1, a front housing member 2 connected to the front end of the cylinder block 1, and a rear housing member 4 connected to the rear end of the cylinder block 1. A valve plate 3 is located between the rear housing member 4 and the cylinder block 1. The front housing member 2, the cylinder block 1 and the rear housing member 4 form a housing. The left side and the right side in FIG. 1 correspond to the front end and the rear end, respectively.

A crank chamber 5 is defined between the cylinder block 1 and the front housing member 2. A drive shaft 6 is supported in the crank chamber 5. A lug plate 11 is fixed to the drive shaft 6 in the crank chamber 5 to rotate integrally with the drive shaft 6.

The front end of the drive shaft 6 is connected to an internal combustion engine 101, through a power transmission mechanism PT. In this embodiment, the power transmission mechanism PT is a clutchless mechanism that includes, for example, a belt and a pulley. Alternatively, the mechanism PT may be a clutch mechanism (for example, an electromagnetic clutch) that selectively transmits power in accordance with the value of an externally supplied current.

A drive plate, which is a swash plate 12 in this embodiment, is accommodated in the crank chamber 5. The swash plate 12 slides along the drive shaft 6 and inclines with respect to the axis of the drive shaft 6. A hinge mechanism 13 is provided between the lug plate 11 and the swash plate 12. The swash plate 12 is coupled to the lug plate 11 and the drive shaft 6 through the hinge mechanism 13. The swash plate 12 rotates synchronously with the lug plate 11 and the drive shaft 6.

Formed in the cylinder block 1 are cylinder bores 1a (only one is shown in FIG. 1) at constant angular intervals around the drive shaft 6. Each cylinder bore 1a accommodates a single headed piston 20 such that the piston can reciprocate in the bore 1a. In each bore 1a is a compression chamber, the displacement of which varies in accordance with the reciprocation of the piston 20. The front end of each piston 20 is connected to the periphery of the swash plate 12 through a pair of shoes 19. As a result, the rotation of the swash plate 12 is converted into reciprocation of the pistons 20, and the strokes of the pistons 20 depend on the inclination angle of the swash plate 12.

The valve plate 3 and the rear housing member 4 define, between them, a suction chamber 21 and a discharge chamber 22, which surrounds the suction chamber 21. The valve plate 3 forms, for each cylinder bore 1a, a suction port 23, a suction valve 24 for opening and closing the suction port 23, a discharge port 25, and a discharge valve 26 for opening and closing the discharge port 25. The suction chamber 21 communicates with each cylinder bore 1a through the corresponding suction port 23, and each cylinder bore 1a communicates with the discharge chamber 22 through the corresponding discharge port 25.

When the piston 20 in a cylinder bore 1a moves from its top dead center position to its bottom dead center position, the refrigerant gas in the suction chamber 21 flows into the cylinder bore 1a through the corresponding suction port 23 and the corresponding suction valve 24. When the piston 20 moves from its bottom dead center position toward its top dead center position, the refrigerant gas in the cylinder bore 1a is compressed to a predetermined pressure, and it forces the corresponding discharge valve 26 to open. The refrigerant gas is then discharged through the corresponding discharge port 25 and the corresponding discharge valve 26 into the discharge chamber 22.

The inclination angle of the swash plate 12 (the angle between the swash plate 12 and a plane perpendicular to the axis of the drive shaft 6) is determined on the basis of various moments such as the moment of rotation caused by the centrifugal force upon rotation of the swash plate, the moment of inertia based on the reciprocation of the piston 20, and a moment due to the gas pressure. The moment due to the gas pressure is based on the relationship between the pressure in the cylinder bores 1a and the crank pressure Pc. The moment due to the gas pressure increases or decreases the inclination angle of the swash plate 12 in accordance with the crank pressure Pc.

In this embodiment, the moment due to the gas pressure is changed by controlling the crank pressure Pc with a displacement control valve CV. The inclination angle of the swash plate 12 can be changed to an arbitrary angle between the minimum inclination angle (shown by a solid line in FIG. 1) and the maximum inclination angle (shown by a broken line in FIG. 1).

As shown in FIGS. 1 and 2, a control mechanism for controlling the crank pressure Pc includes a bleed passage 27, a supply passage 28, and a control valve CV. The bleed passage 27 connects the suction chamber 21 and the crank chamber 5. The supply passage 28 is for connecting the discharge chamber 22 and the crank chamber 5. The control valve CV is provided in the supply passage 28.

As illustrated in FIG. 2, the control valve CV includes an inlet valve portion and a solenoid portion 41. A valve 30 housing 42 of the inlet valve portion is formed with an inlet port 43, a valve chamber 44, a valve hole 45 and an outlet port 46. The inlet port 43, valve chamber 44, valve hole 45 and outlet port 43 form part of a supply passage 28. The valve chamber 44 contains a valve body 47 arranged to move into contact with and away from the edge of the valve hole 45, and a first spring 48 which urges the valve body 47 in the direction in which the valve hole 45 is closed.

The solenoid portion 41 includes a fixed iron core 49, a movable iron core 50, a coil 51, which is located outside both iron cores 49, 50, and a second spring 52. A rod 53 is located between the movable iron core 50 and the valve body 47 for transmitting force from the movable iron core 50 to the valve body 47. The second spring 52 has a force larger than that of the first spring 48. The second spring 52 urges the valve body 47 through the movable iron core 50 and the rod 53 in a direction in which the valve hole 45 is opened. As the coil 51 is supplied with a current from the outside, an attracting electromagnetic force is generated between the iron cores 49, 50. This electromagnetic force acts in the direction opposite to the force of the second spring 52. The current supplied to the coil 51 is controlled by adjusting a voltage applied to the coil 51. In this embodiment, duty control is employed for adjusting the applied voltage.

As illustrated in FIG. 2, when the coil 51 is supplied, for example, with no current (duty ratio=0%), the upward force of the second spring 52 dominantly determines the position of the valve body 47. Therefore, the valve body 47 is spaced furthest away from the valve hole 45, and the control valve CV is fully open. As a result, the pressure Pc within the crank chamber 5 reaches a maximum value, and the difference between the crank pressure Pc and the pressure within the cylinder bore 1a is increased. This results in minimum inclination of the swash plate 12 and the discharge displacement of the compressor 104 is minimized.

As the coil 51 is supplied with a current, the duty ratio of which is equal to or greater than a minimum duty ratio DtS(min) within the variable range of the duty ratio Dt (DtS(min)>0), the downward electromagnetic force exceeds the upward force of the second spring 52, which causes the valve body 47 to move downward. In this state, the downward force of the first spring 48 and the additional downward electromagnetic force act against the upward force of the second spring 52. In other words, the position of the valve body 47 with respect to the valve hole 45, i.e., the opening degree of the control valve CV, is determined based on the balance between the downward forces exerted by the first spring 48 and the electromagnetic force and the upward force exerted by the second spring 52.

By adjusting the opening of the control valve CV in accordance with the electromagnetic force, the flow rate of gas flowing into the crank chamber 5 through the supply passage 28 is adjusted, and the crank pressure Pc is determined by the relationship between the flow rate of gas entering the crank chamber 5 and the flow rate of gas existing the crank chamber 5 (through the bleed passage 27). In response to a change in the crank pressure Pc, the difference between the crank pressure Pc and the pressure in the cylinder bore 1a is changed. As a result, the inclination of the swash plate 12 is changed to adjust the stroke of the piston 20, i.e., the discharge displacement.

As illustrated in FIG. 1, a refrigerant circuit of the vehicle air conditioner includes the compressor 104 and an external refrigerant circuit 30. The external refrigerant circuit 30 includes, for example, a condenser 31, an expansion valve 32 as a decompression device, and an evaporator 33. The position of the expansion valve 32 is controlled in a feedback manner based on the temperature detected by a temperature sensitive sensor 34, which is located near the outlet of the evaporator 33 or on the downstream side of the evaporator 33, and the pressure near the outlet of the evaporator 33. The expansion valve 32 supplies the evaporator 33 with a liquid refrigerant corresponding to the thermal load on the air conditioner to adjust the amount of refrigerant flowing through the external refrigerant circuit 30.

As illustrated in FIG. 2, the vehicle is equipped with an A/C-ECU 61 for controlling the air conditioning system (except for the control of the control valve CV); a CVT-ECU 62 for controlling the continuous variable transmission 103; and an E/G-ECU 63 for controlling the internal combustion engine 101. Each of the ECUs 61–63 is a control unit such as a computer which includes a CPU, a ROM, a RAM and an I/O interface.

The respective ECUs 61–63 are interconnected through a communication line 64. The communication line 64 includes a main line 64a and an auxiliary line 64b. Serial communication is performed between the respective ECUs 61–63. A representative protocol for such an on-board network is called Control Area Network (C·A·N).

In the A/C-ECU 61, I/O input terminals are connected to an A/C switch 65 (a switch manipulated by a passenger for turning the air conditioning system on or off); a temperature setting device 66 for setting a preferred target temperature Te(set) in the passenger compartment; a temperature sensor 67 for detecting a temperature Te(t) in the passenger compartment; a discharge pressure sensor 68 for detecting the pressure Pd in a discharge pressure region of the refrigerant circuit; and a suction pressure sensor 69 for detecting the pressure Ps in a suction pressure region of the refrigerant circuit. In this embodiment, the A/C switch 65, temperature setting device 66 and temperature sensor 67 function as an external information detector. In this embodiment, the ON/OFF state of the A/C switch 65, the temperature Te(t) detected by the temperature sensor 67, and the target temperature Te(set) set by the temperature setting device 66, serve as external information for controlling the air conditioning.

In the A/C-ECU 61, I/O output terminals are connected to a condenser fan 70 for cooling the condenser 31 and an evaporator fan 71 for forming an air flow that passes through the evaporator 33 into the passenger compartment. In this embodiment, the condenser fan 70 and the evaporator fan 71 constitute air conditioning control components other than the compressor 104.

In the CVT-ECU 62, an I/O input terminal is connected to a vehicle speed sensor 73 for detecting the running speed V of the vehicle, and an I/O output terminal is connected to the continuous variable transmission 103.

In the E/G ECU 63, I/O input terminals are connected to an acceleration position sensor 74 for detecting the position of the acceleration (the amount of depression of an accelerating pedal) Acc; an engine speed sensor 75 for detecting the rotational speed Ne of the internal combustion engine 101; and an intake air pressure sensor 76 for detecting the intake air pressure Pa of the internal combustion engine 101, respectively. In the E/G ECU 63, I/O output terminals are connected to an electronically controlled throttle valve mechanism 77 located in the supply passage of the internal combustion engine 101; a fuel injector 78 for directly injecting a fuel into a combustion chamber of the internal combustion engine 101; and a drive circuit 79 for supplying current to the coil 51 of the control valve CV.

The A/C ECU 61 determines the target duty ratio DtS, which is applied to the drive circuit 79, based on the ON/OFF state of the A/C switch 65, the temperature Te(t) detected by the temperature sensor 67, the target temperature Te(set) set by the temperature setting device 66, and the actual duty ratio DtF received from the E/G-ECU 63. The A/C-ECU 61 transmits the determined target duty ratio DtS, the value of the discharge pressure Pd detected by the discharge pressure sensor 68, and the suction pressure Ps detected by the suction pressure sensor 69 to the E/G-ECU 63. In this embodiment, A/C-ECU 61 functions as a computer for calculating the target duty ratio Dts.

The A/C-ECU 61 selectively starts and stops the condenser fan 70 and/or the evaporator fan 71 to start or stop forced air through the condenser 31 and the evaporator 33, respectively, based on the ON/OFF state of the A/C switch 65, the temperature Te(t) detected by the temperature sensor 67, the target temperature Te(set) set by the temperature setting device 66, the discharge pressure Pd detected by the discharge pressure sensor 68, the suction pressure Ps detected by the suction pressure sensor 69; and the actual duty ratio DtF received from the E/G-ECU 63.

The E/G-ECU 63 determines the actual duty ratio DtF based on the accelerator position Acc from the accelerator position sensor 74 and the target duty ratio DtS received from the A/C-ECU 61. The E/G-ECU 63 sends the determined actual duty ratio DtF to the drive circuit 79 and transmits the actual duty ratio DtF to the A/C-ECU 61. The drive circuit 79 controls the current supplied to the coil 51 of the control valve CV in response to the actual duty ratio DtF. In this embodiment, the E/G-ECU 63 functions as a computer for controlling the engine.

The E/G-ECU 63 calculates the required engine output torque based on the accelerator position Acc from the acceleration position sensor 74 and the rotational speed Ne from the engine speed sensor 75. Also, the E/G-ECU 63 estimates the driving torque of the compressor 104 based on the actual duty ratio DtF sent to the drive circuit 79 and the discharge pressure Pd and the suction pressure Ps received from the A/C-ECU 61. The relationship among the driving torque of the compressor 104, the actual duty ratio DtF, the discharge pressure Pd and the suction pressure Ps is predetermined experimentally. Information representing this relationship (function) is previously stored in the E/G-ECU 63. The information is used for estimating the driving torque of the compressor 104.

The E/G-ECU 63 adds the driving torque of the compressor 104, a previously stored total driving torque of an auxiliary device or devices other than the compressor 104 (though not shown, for example, a hydraulic pump associated with a power steering device) and so on to the required output torque to calculate a target engine output torque Tr. The E/G-ECU 63 transmits the calculated target engine output torque Tr to the CVT-ECU 62. In accordance with the target engine output torque Tr, a target throttle opening degree is determined. The E/G-ECU 63 transmits the target throttle opening to the throttle valve mechanism 77. Thus, the throttle valve mechanism 77 adjusts the opening degree of the throttle valve, not shown, according to the target throttle opening. The amount of intake air to the internal combustion engine 101 is determined by the opening degree of the throttle valve.

The E/G-ECU 63 calculates a target fuel injection amount based on the value of the intake air pressure Pa, which is detected by the intake air pressure sensor 76 and which correlates with the flow rate of intake air, and a previously stored stoichiometric air/fuel ratio. The E/G-ECU 63 transmits the target fuel injection amount to the fuel injector 78. Accordingly, the fuel injector 78 injects the target amount of fuel corresponding to the stoichiometric air/fuel ratio into the combustion chamber of the internal combustion engine 101 in a suction stroke.

The CVT-ECU 62 determines a target value of the rotational speed Ne of the internal combustion engine 101. The rotational speed target value is based on the target engine output torque Tr and optimal fuel consumption. Further, the CVT-ECU 62 calculates a target transmission ratio based on the target value of the rotational speed Ne and the vehicle speed V detected by the vehicle speed sensor 73. The CVT-ECU 62 transmits the calculated target transmission ratio to the continuous variable transmission 103.

Accordingly, the continuous variable transmission 103 adjusts, for example, a pulley ratio (effective diameter ratio) between the drive pulley and the driven pulley to the target transmission ratio. In this way, the rotational speed Ne of the internal combustion engine 101 is adjusted to the target value. As a result, the internal combustion engine 101 is driven in accordance with the engine output torque (Tr) and the rotational speed Ne and the optimal fuel consumption.

In the following, a routine executed by the E/G-ECU 63 for determining the actual duty ratio DtF and a routine executed by the A/C-ECU 61 for calculating the target duty ratio DtS will be described in detail. As an ignition switch (or a start switch) of the vehicle, not shown, is turned ON, each of the ECUs 61, 63 is supplied with a current to start an associated routine.

Figure 3:
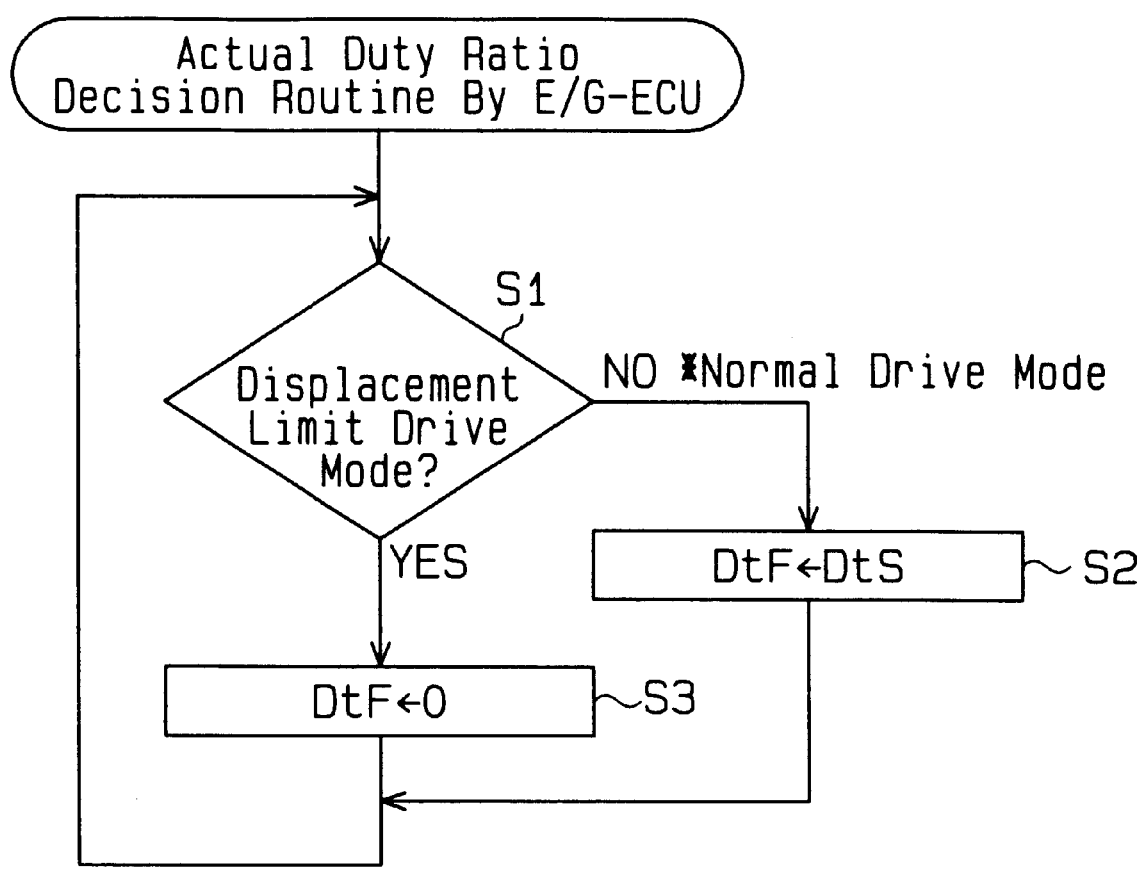
FIG. 3 shows a flow chart illustrating an actual duty ratio decision routine used for controlling a control valve of the compressor.

As illustrated in FIG. 3, the E/G-ECU 63 determines in S1 (Step 1), based on the external information, whether the vehicle and the compressor are in a displacement limit drive mode. The displacement limit drive mode is employed, for example, when a large load is applied on the internal combustion engine 101 such as when the vehicle is going up a hill or when the vehicle is accelerated such as when passing. When the operator firmly depresses on the accelerator pedal to cause the acceleration position sensor 74 to detect an accelerator position Acc equal to or larger than a predetermined value, the E/G-ECU 63 selects the displacement limit drive mode.

When the vehicle is not in the displacement limit drive mode, the outcome of S1 is NO. Specifically, the E/G-ECU 63 determines that the vehicle is in a normal drive mode, which permits as much power as is necessary to be allocated for driving the compressor 104. Next, in S2, the E/G-ECU 63 sets the target duty ratio DtS received from the A/C-ECU 61 as the actual duty ratio DtF, which is transmitted to the drive circuit 79.

When the vehicle is in the displacement limit drive mode, the outcome of S1 is YES. Next, in S3, the E/G-ECU 63 sets the actual duty ratio DtF to 0%, ignores the target duty ratio DtS received from the A/C-ECU 61, and instructs the drive circuit 79 to stop supplying current to the coil 51 of the control valve CV. In response, the opening of the control valve CV is increased to the maximum by the action of the second spring 52, which increases the crank pressure Pc. This minimizes the discharge displacement and load torque of the compressor 104 and reduces the load on the internal combustion engine 101 during the displacement limit drive mode. As a result, hill-climbing performance and accelerating performance, for example, are improved.

Figure 4:
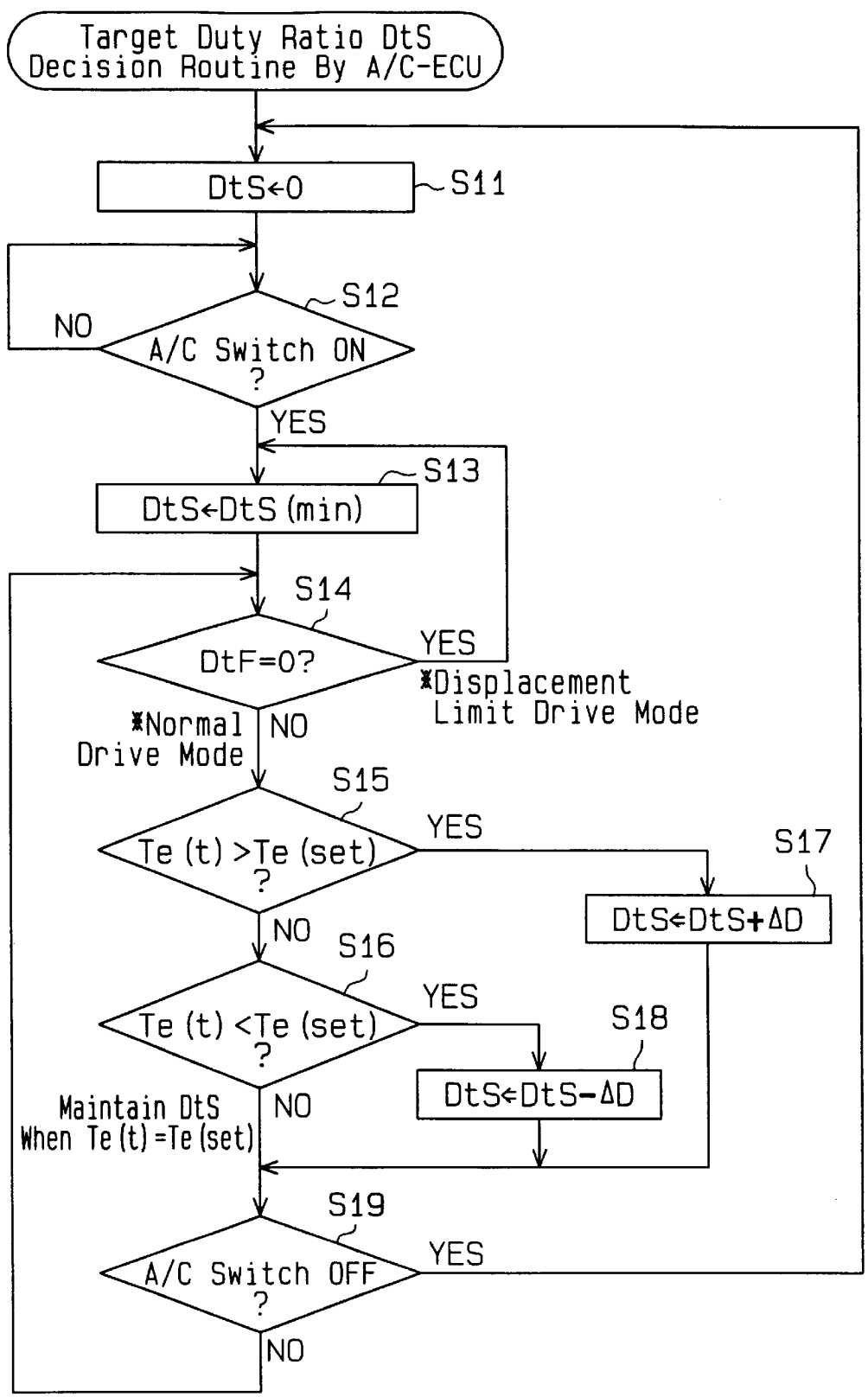
FIG. 4 shows a flow chart illustrating a target duty ratio calculation routine.

As shown in FIG. 4, the A/C-ECU 61 performs an initial settings in S11. For example, the value of the target duty ratio DtS is set to 0% (no current supplied to the control valve). Next, the process performs to state monitoring and modification of the target duty ratio DtS, which are shown in S12 and subsequent steps.

In S12, the A/C-ECU 61 monitors the ON/OFF state of the A/C switch 65 until this switch 65 is turned ON. When the A/C switch 65 is turned ON, the A/C-ECU 61 sets the value of the target duty ratio DtS to the minimum duty ratio DtS(min) in S13. In S14, the A/C-ECU 61 determines whether the value of the actual duty ratio DtF received from the E/G-ECU 63 is 0%, i.e., whether the vehicle is in the displacement limit drive mode.

When the outcome is YES in S14, the process returns to S13. Specifically, the target duty ratio DtS is set to the minimum duty ratio DtS(min) until the vehicle is returned to the normal drive mode. This is because subtle modification to the value of the target duty ratio DtS, which is performed from S15 to S18, is meaningless if the value of the actual duty ratio DtF is fixed to 0% in the E/G-ECU 63. Also, if the value of the target duty ratio DtS were, for example, 100%, the actual duty ratio DtF would be suddenly changed from 0% to 100% when the vehicle is released from the displacement limit drive mode. As a result, the discharge displacement and the driving torque of the compressor 104 would be suddenly increased, which would cause a sudden decrease in the rotational speed of the internal combustion engine 101.

When the outcome of S14 is NO, i.e., when the vehicle is in the normal operating mode, S15 is performed. In S15, the A/C-ECU 61 determines whether or not the temperature Te(t) detected by the temperature sensor 67 is higher than the target temperature Te(set) set by the temperature setting device 66. When the A/C-ECU 61 determines that the outcome of S15 is NO, S16 is performed. In S16, the A/C-ECU 61 determines whether or not the detected temperature Te(t) is lower than the target temperature Te(set).

When the outcome of S16 is NO, the temperature Te(t) matches the target temperature Te(set). Therefore, there is no need to change the duty ratio Dt, which would lead to a change in cooling performance. For this reason, S19 is performed without the A/C-ECU 61 changing the value of the target duty ratio DtS that was transmitted to the E/G-ECU 63.

When the outcome of S15 is YES, S17 is performed. When YES is the outcome in S15, it is estimated that the passenger compartment is hot and there is a large thermal load in the passenger compartment. In S17, the A/C-ECU 61 increases the value of the target duty ratio DtS by a unit amount ΔD, and transmits the modified value (DtS+ΔD) to the E/G-ECU 63. Consequently, the modified value (DtS+ΔD) is sent from the E/G-ECU 63 to the drive circuit 79 as a new actual duty ratio DtF. As a result, the opening of the control valve CV is slightly reduced, which increases the discharge displacement of the compressor 104, increases the heat removing performance of the evaporator 33, and lowers the temperature Te(t).

When the outcome of S16 is YES, S18 is performed. When the outcome is YES in S16, it is estimated that the passenger compartment is cold and there is a small thermal load in the passenger compartment. In S18, the A/C-ECU 61 decreases the value of the target duty ratio DtS by the unit amount AD, and transmits the modified value (DtS−ΔD) to the E/G-ECU 63. Consequently, the modified value (DtS−ΔD) is sent from the E/G-ECU 63 to the drive circuit 79 as a new actual duty ratio DtF. As a result, the opening of the control valve CV is slightly increased, which reduces the discharge displacement of the compressor 104, reduces the heat removing performance of the evaporator 33, and increases the temperature Te(t).

In S19, the A/C-ECU 61 determines whether or not the A/C switch 65 is turned OFF. When the outcome is NO in S19, S14 is performed to repeat the foregoing steps.

On the other hand, when the outcome is YES in S19, the processing returns to S11 to stop supplying the current to the coil 51 of the control valve CV.

As described above, when the vehicle is in the normal driving mode, the target duty ratio DtS is modified in S17 and/or S18 so that, even if the detected temperature Te(t) deviates from the target temperature Te(set), the target duty ratio DtS is gradually optimized to steer the temperature Te(t) to the target temperature Te(set).

This embodiment has the following advantages.

The E/G-ECU 63 directly controls the control valve CV, i.e., the discharge displacement of the compressor 104. Therefore, for example, during the displacement limit control for acceleration of the vehicle, the selection of the displacement limit control and the issuance of an instruction for minimizing the discharge displacement of the compressor 104 are processed by the E/G-ECU 63 alone. Thus, the steps from the selection of the displacement limit drive mode of the vehicle to the minimization of the discharge displacement of the compressor 104 are performed rapidly without being affected by the communication speed on the on-board network or congestion on the network. As a result, the hill-climbing performance and accelerating performance of the vehicle are further improved.

When the target engine output torque Tr is calculated for cooperatively controlling the internal combustion engine 101 and the continuous variable transmission 103, the E/G-ECU 63 can estimate the driving torque of the compressor 104 based on the actual duty ratio DtF of the current being sent to the drive circuit 79, i.e., the control state of the compressor 104. Therefore, for example, as compared with the prior art, in which the A/C-ECU 61 directly controls the control valve CV, more specifically, the prior art in which the A/C-ECU 61 calculates the target duty ratio DtS and determines the value of the actual duty ratio DtF, it is possible to prevent the degradation of real time performance due to the communication speed of transmitting the actual duty ratio DtF from the A/C-ECU 61 to the E/G-ECU 63. It is further possible to calculate in real time the current driving torque of the compressor 104 and the current power requirement of the internal combustion engine 101 (target engine output torque Tr). As a result, a highly accurate cooperative control is accomplished between the internal combustion engine 101 and the continuous variable transmission 103. This improves the fuel economy of the internal combustion engine 101.

For estimating the driving torque of the compressor 104, the E/G-ECU 63 also refers to the value of the discharge pressure Pd and the suction pressure Ps received from the A/C-ECU 61. Since the values of the discharge pressure Pd and suction pressure Ps are received from the A/C-ECU 61, a degradation in response performance is contemplated due to the communication speed or the like. However, the values of the discharge pressure Pd and suction pressure Ps slowly vary. Therefore, with a simple delay caused by the communication speed on the on-board network and congestion on the network, the values of the discharge pressure Pd and suction pressure Ps would hardly affect the estimation of the driving torque of the compressor 104.

Next, a second embodiment of the present invention will be described with reference to FIGS. 5 and 6. This embodiment differs from the embodiment of FIGS. 1 to 4 in the structure of the control valve CV. In this embodiment, differences between the first embodiment and the second embodiment will only be described, while the same parts are designated the same reference numerals and a detailed description is omitted.

Figure 5:
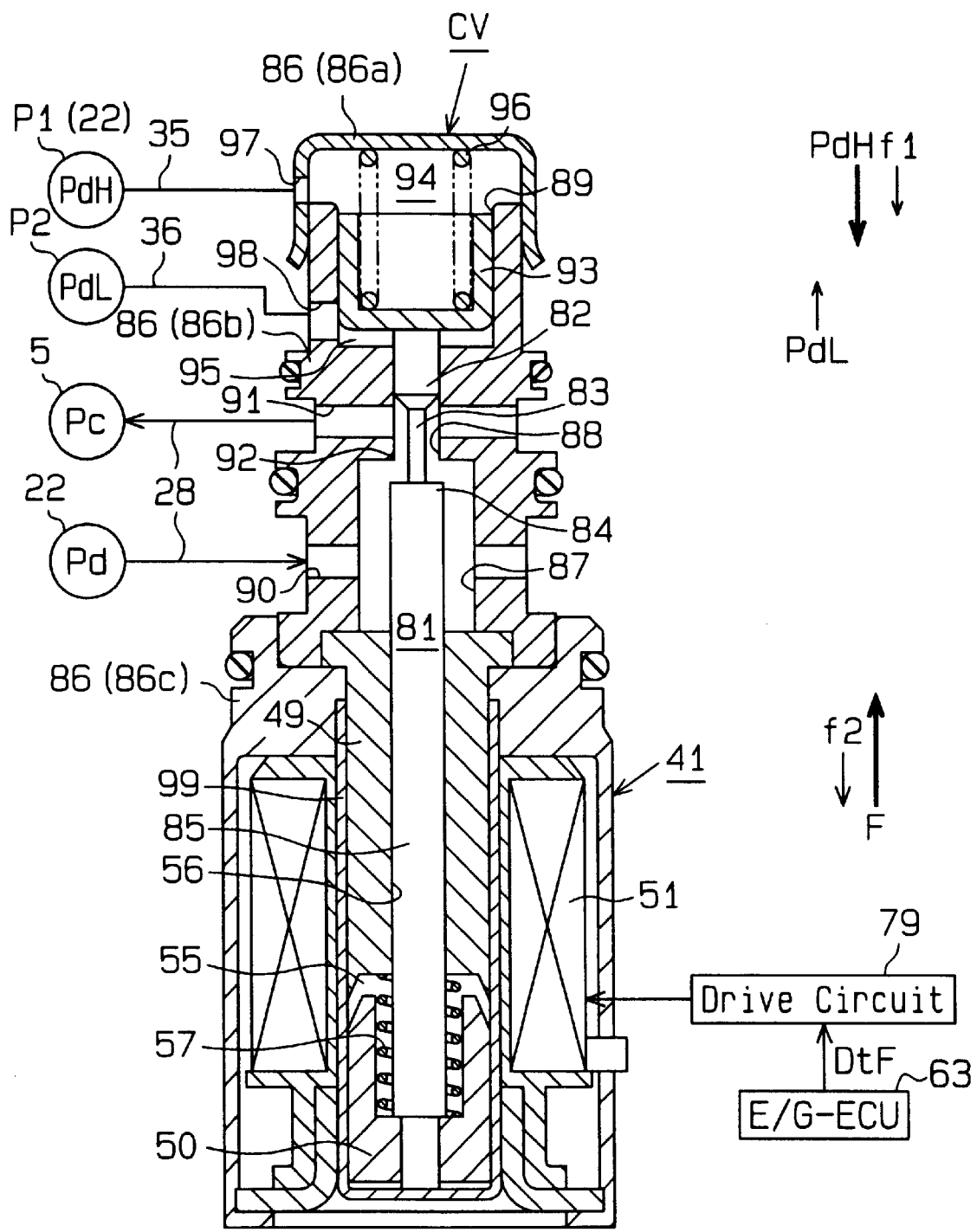
FIG. 5 is a cross-sectional view illustrating a control valve in a second embodiment.

As illustrated in FIG. 5, a stick-shaped rod 81 is located in a control valve CV. A solenoid portion 41, which is a target differential pressure changing means, controls the rod 81 based on a supply current from the outside. The rod 81 includes a distal end 82, a coupling portion 83, a valve body 84 substantially at the center, and a guide portion 85.

A valve housing 86 of the control valve CV includes of a cap 86a, an upper half body 86b, which forms a main outer shell of an inlet valve portion, and a lower half body 86c, which forms a main outer shell of the solenoid portion 41. A first port 97 is formed through the cap 86a. A second port 98 is formed through the upper half body 86b of the valve housing 86. The upper half body 86b is formed with a valve chamber 87 and a communication path 88. A pressure sensitive chamber 89 is defined between the upper half body 86b and the cap 86a.

The rod 81 is axially movably located within the valve chamber 87 and the communication path 88. The valve chamber 87 and the communication path 88 are selectively connected in accordance with the positioning of the rod 81. The communication path 88 and the pressure sensitive chamber 89 are blocked by the distal end 82 of the rod 81, which is fitted in the communication path 88.

An upper end face of a fixed iron core 49 also serves as a bottom wall of the valve chamber 87. A port 90 extending radially from the valve chamber 87 communicates the valve chamber 87 to a discharge chamber 22 through an upstream portion of a supply passage 28. A port 91 extending radially from the communication path 88 communicates the communication path 88 to the crank chamber 5 through a downstream portion of the supply passage 28. The port 90, valve chamber 87, communication path 88 and port 91 function as a control passage. The control passage forms part of the supply passage 28 which communicates the discharge chamber 22 to the crank chamber 5.

The valve body 84 of the rod 81 is located in the valve chamber 87. The communication path 88 has an inner diameter larger than the outer diameter of the coupling portion 83 of the rod 81, and smaller than the diameter of the guide portion 85. A valve seat 92 is formed in an opening of the communication path 88.

As the rod 81 is moved from a position in FIG. 5 (lowermost moving position) to an uppermost moving position at which the valve body 84 sits on the valve seat 92, the communication path 88 is blocked by the valve body 84. In other words, the valve body 84 functions as an inlet valve body that can selectively adjust an opening degree of the supply passage 28.

A pressure sensitive member 93 in closed cylindrical form is axially movably located in the pressure sensitive chamber 89. The pressure sensitive member 93 divides the pressure sensitive chamber 89 into a first pressure chamber 94 and a second pressure chamber 95. The first pressure chamber 94 and the second pressure chamber 95 are blocked by the pressure sensitive member 93. A first spring 96, which is a coil spring, is contained in the first pressure chamber 94. The first spring 96 urges the pressure sensitive member 93 toward the second pressure chamber 95.

As a larger amount of refrigerant flows through a refrigerant circuit, the pressure loss per unit length of the circuit, or piping, is larger. Specifically, as shown in FIG. 6, a pressure loss (differential pressure) between two pressure monitoring points P1, P2 defined in the refrigerant circuit shows a positive correlation with the amount of refrigerant flowing through the circuit. Therefore, the amount of refrigerant flowing through the refrigerant circuit is indirectly detected by finding a difference PdH-PdL (hereinafter called the "two-point differential pressure $\Delta Pd$") between the pressure PdH at the first pressure monitoring point P1 and the pressure PdL at the second pressure monitoring point P2, which is downstream of the first pressure monitoring point P1 and lower than the pressure PdH.

In this embodiment, the first pressure monitoring point P1 is located in the discharge chamber 22, which is the location most upstream of a discharge pressure region, and the second pressure monitoring point P2 is located in a passage (passage connecting the discharge chamber 22 of a compressor 104 to a condenser 31) a predetermined distance away from the first pressure monitoring point P1. The gas pressure PdH at the first pressure monitoring point P1 is applied to the first pressure chamber 94 of the control valve CV through the first port 97 and a first pressure detecting passage 35. The gas pressure PdL at the second pressure monitoring point P2 is applied to the second pressure chamber 95 through the second port 98 and a second pressure detecting passage 36. The second pressure detecting passage 36 is omitted in FIG. 6.

The solenoid portion 41 includes a housing cylinder 99 in a closed cylindrical form. A fixed iron core 49 is fitted in the housing cylinder 99. A solenoid chamber 55 is defined in the housing cylinder 99 by this fitting. A movable iron core 50 is axially movable in the solenoid chamber 55. The fixed iron core 49 is formed with an axial guide hole 56. The guide portion 85 of the rod 81 is fitted in the guide hole 56 and is permitted to more axially.

The solenoid chamber 55 contains a proximal end of the rod 81. More specifically, the lower end of the guide portion 85 is fitted into and fixed in a hole formed through the center of the movable iron core 50 in the solenoid chamber 55. Therefore, the movable iron core 50 moves up and down integrally with the rod 81 at all times.

A second spring 57, which is a coil spring, is contained between the fixed iron core 49 and the movable iron core 50 in the solenoid chamber 55. The second spring 57 urges the movable iron core 50 in a direction in which the movable iron core 50 is moved away from the fixed iron core 49, i.e., in the downward direction.

In the control valve CV of this embodiment, the position of the rod 81, i.e., the valve opening degree, is determined in the following manner. The influence exerted by the pressure within the communication path 88 and the solenoid chamber 55 to the positioning of the rod 81 is ignored.

When the value of the actual duty ratio DtF is zero, downward forces f1+f2 of the first spring 96 and the second spring 57 dominantly act on the positioning of the rod 81. Therefore, as illustrated in FIG. 5, the rod 81 remains at the lowermost moving position, so that the valve body 84 fully opens the communication path 88. Consequently, the crank pressure Pc is maximized, and the discharge displacement of the compressor 104 is minimized.

As the value of the actual duty ratio DtF sent by the E/G-ECU 63 to the drive circuit 79 is equal to or larger than the minimum duty ratio (DtS(min)), an upward electromagnetic force F between the fixed iron core 49 and the movable iron core 50 exceeds the downward forces f1+f2 of the first spring 96 and the second spring 57, causing the rod 81 to move upward. In this sate, the upward electromagnetic force F, which is countered by the downward force f2 of the second spring 57 acts against a downward force based on the two-point differential pressure $\Delta Pd$, which is complementary to the downward force f1 of the first spring 96. In other words, the valve body 84 of the rod 81 is positioned with respect to the valve seat 92 such that the upward electromagnetic force F, which is countered by the downward force f2 of the second spring 57, is balanced with the downward force based on the two-point differential pressure $\Delta Pd$, which adds to the downward force f1 of the first spring 96.

For example, as the rotational speed Ne of the internal combustion engine 101 becomes lower and causes a reduction in the amount of refrigerant flowing through the refrigerant circuit, the two-point differential pressure $\Delta Pd$ decreases, and the forces acting on the rod 81 are off balance. Therefore, the rod 81 is moved upward, which compresses the first spring 96 and the second spring 57. As a result, the downward forces f1+f2 are increased. The valve body 84 of the rod 81 is positioned such that this increase compensates for the decrease of the force change resulting from the change in the two-point differential pressure $\Delta Pd$. This reduces the opening degree of the communication path 88 and reduces the crank pressure Pc. Therefore, the difference in pressure between the crank pressure Pc and the pressure within the cylinder bore 1a decreases, which increases the inclination angle of the swash plate 12. Consequently, the discharge displacement of the compressor 104 increases. As the discharge displacement of the compressor 104 increases, the amount of refrigerant flowing through the refrigerant circuit also increases, which increases the two-point differential pressure $\Delta Pd$.

On the other hand, as the rotational speed Ne of the internal combustion engine 101 becomes higher to increase the amount of refrigerant flowing through the refrigerant circuit, the two-point differential pressure ΔPd increases and the forces acting on the rod 81 are off balance. Therefore, the rod 81 is moved downward to position the valve body 84 of the rod 81 to a position at which a decrease in the downward forces f1+f2 by the first spring 96 and the second spring 57 compensates for the increase in force corresponding to the two-point differential pressure ΔPd. This reduces the opening degree of the communication path 88 and increases the crank pressure Pc. Therefore, the difference in pressure between the crank pressure Pc and the pressure within the cylinder bore 1a increases, which reduces the inclination angle of the swash plate 12. Consequently, the discharge displacement of the compressor 104 decreases. As the discharge displacement of the compressor 104 is reduced, the amount of refrigerant flowing through the refrigerant circuit is also reduced and the two-point differential pressure ΔPd decreases.

Also, as the electromagnetic force F is increased, for example, by increasing the actual duty ratio DtF sent by the E/G-ECU 63 to the drive circuit 79, the forces acting on the rod 81 are off balance. Therefore, the rod 81 is moved upward to compress the first spring 96 and the second spring 57. Thus, the valve body 84 of the rod 81 is positioned such that an increase in the downward forces f1+f2 of the springs 57, 96 compensates for the increase in upward electromagnetic force F. This reduces the opening degree of the control valve CV, i.e., the size of the communication path 88, and increases the discharge displacement of the compressor 104. As the discharge displacement of the compressor 104 is increased, the amount of refrigerant flowing through the refrigerant circuit is also increased and the two-point differential pressure ΔPd increases.

On the other hand, as the E/G-ECU 63 reduces the actual duty ratio DtF to reduce the electromagnetic force F, the forces acting on the rod 81 become out of balance. Therefore, the rod 81 is moved downward. Thus, the valve body 84 of the rod 81 is set at a position at which a decrease in the downward forces f1+f2 of both springs 57, 96 compensates for the decrease in the upward electromagnetic force F. This increases the opening degree of the communication path 88 and decreases in the discharge displacement of the compressor 104. As the discharge displacement of the compressor 104 is reduced, the amount of refrigerant flowing through the refrigerant circuit is also reduced and the two-point differential pressure ΔPd decreases.

As described above, the control valve CV internally and automatically positions the rod 81 in response to variations in the two-point differential pressure ΔPd to maintain a target value of the two-point differential pressure ΔPd, which is determined by the actual duty ratio DtF. As the E/G-ECU 63 changes the value of the actual duty ratio DtF sent to the drive circuit 9, the target value is changed.

This embodiment has the following advantages in addition to the advantages provided by the embodiment of FIGS. 1 through 4.

The control valve CV is configured to internally and automatically maintain a differential pressure determined by the actual duty ratio DtF. Therefore, for example, even if the rotational speed Ne of the internal combustion engine 101 varies, it is possible to maintain the amount of refrigerant flowing through the refrigerant circuit constant and maintain the temperature Te(t) at the target temperature Te(set) without changing the target duty ratio DtS. It is therefore possible to prevent frequent changes to the target duty ratio DtS and reduce operational loads on the A/C-ECU 61 and E/G-ECU 63.

Some conventional control valves change a target suction pressure. This type of control valve mechanically detects a suction pressure Ps and changes the discharge displacement of the compressor 104 to cancel variations in the detected suction pressure Ps. The use of such a control valve CV does not depart from the spirit of the present invention.

Even in an air conditioning system that includes a control valve that changes a target suction pressure, the current suction pressure Ps can always be maintained at a lower value compared with the target suction pressure by setting the target suction pressure to be higher than the normal target suction pressure during the displacement limit control for the vehicle. Therefore, the compressor 104 is guided in a direction in which the suction pressure Ps is increased, i.e., in a direction in which the discharge displacement is minimized, thereby reducing the load on the internal combustion engine 101.

However, when the evaporator 33 is burdened with an excessive thermal load, the suction pressure Ps is so high that even if the target suction pressure is set sufficiently high, the discharge displacement of the compressor 104 will not decrease enough to reduce the load on the internal combustion engine 101. In other words, if the control process relies on the suction pressure Ps, even if the target suction pressure is simply modified to a high value, the discharge displacement cannot be immediately changed, unless the thermal load on the evaporator 33 changes in response to the modification of the target suction pressure.

In this embodiment, however, the feedback control of the discharge displacement of the compressor 104 is implemented using, as a directly controlled parameter, the differential pressure ΔPd between two pressure monitoring points P1, P2 in the refrigerant circuit. Therefore, during the displacement limit control for the vehicle, the discharge displacement of the compressor 104 can be rapidly minimized without being affected by the thermal load on the evaporator 33. As a result, the hill-climbing performance and accelerating performance of the vehicle is improved.

The amount of refrigerant flowing through the refrigerant circuit is reflected in the actual duty ratio DtF for controlling the control valve CV. The driving torque of the compressor 104 is most largely reflected in the amount of refrigerant flowing through the refrigerant circuit. Therefore, the E/G-ECU 63 can accurately estimate the driving torque of the compressor 104 by referring to the actual duty ratio DtF. As a result, it is possible to more accurately perform the cooperative control of the internal combustion engine 101 and the continuous variable transmission 103. From a different point of view, the use of the control valve CV of this embodiment allows the driving torque of the compressor 104 to be estimated from the actual duty ratio DtF, for example, without using the discharge pressure Pd and the suction pressure Ps. It is therefore possible to eliminate the expensive discharge pressure sensor 68 and suction pressure sensor 69.

The present invention may be modified as follows.

In the respective embodiments, the E/G-ECU 63 may refer to the temperature of the suction chamber 21 instead of the suction pressure Ps when it estimates the driving torque of the compressor 104. In other words, a temperature sensor, which is less expensive than the suction pressure sensor 69, may be used.

In the embodiment of FIGS. 1 through 4, the A/C-ECU 61 may additionally refer to the discharge pressure Pd and the suction pressure Ps when it calculates the target duty ratio DtS.

In the respective embodiments described above, the A/C-ECU 61 may refer to the duration of sunshine in the passenger compartment, the temperature on the surface of the evaporator 33, the temperature of air that has passed through the evaporator 33, and the like when it calculates the target duty ratio DtS.

The E/G-ECU 63 may determine, based on the rotational speed Ne of the internal combustion engine 101, whether or not the vehicle is in the displacement limit drive mode. In this case, the displacement limit driving mode is determined when the rotational speed Ne is equal to or higher than a predetermined rotational speed.

The E/G-CPU 63 may determine based on the vehicle speed V received from the CVT-ECU 62 whether or not the vehicle is in the displacement limit driving mode. In this case, the displacement limit driving mode is determined when the vehicle speed V is equal to or higher than a predetermined vehicle speed.

The E/G-ECU 63 may detect the temperature of cooling water for cooling the internal combustion engine 101 to determine based on the temperature of the cooling water whether or not the vehicle is in the displacement limit driving mode. In this case, the displacement limit driving mode is determined when the cooling water temperature is equal to or higher than a predetermined temperature. A temperature sensor for detecting the temperature of the cooling water may be connected to the A/C-ECU 61 or to the E/G-ECU 63. When the temperature sensor is connected to the A/C-ECU 61, information on the cooling water temperature is transmitted from the A/C-ECU 61 to the E/G-ECU 63.

The control valve CV may be a so-called drain-side control valve for adjusting the crank pressure Pc by adjusting the opening degree of the bleed passage 27.

Figure 6:
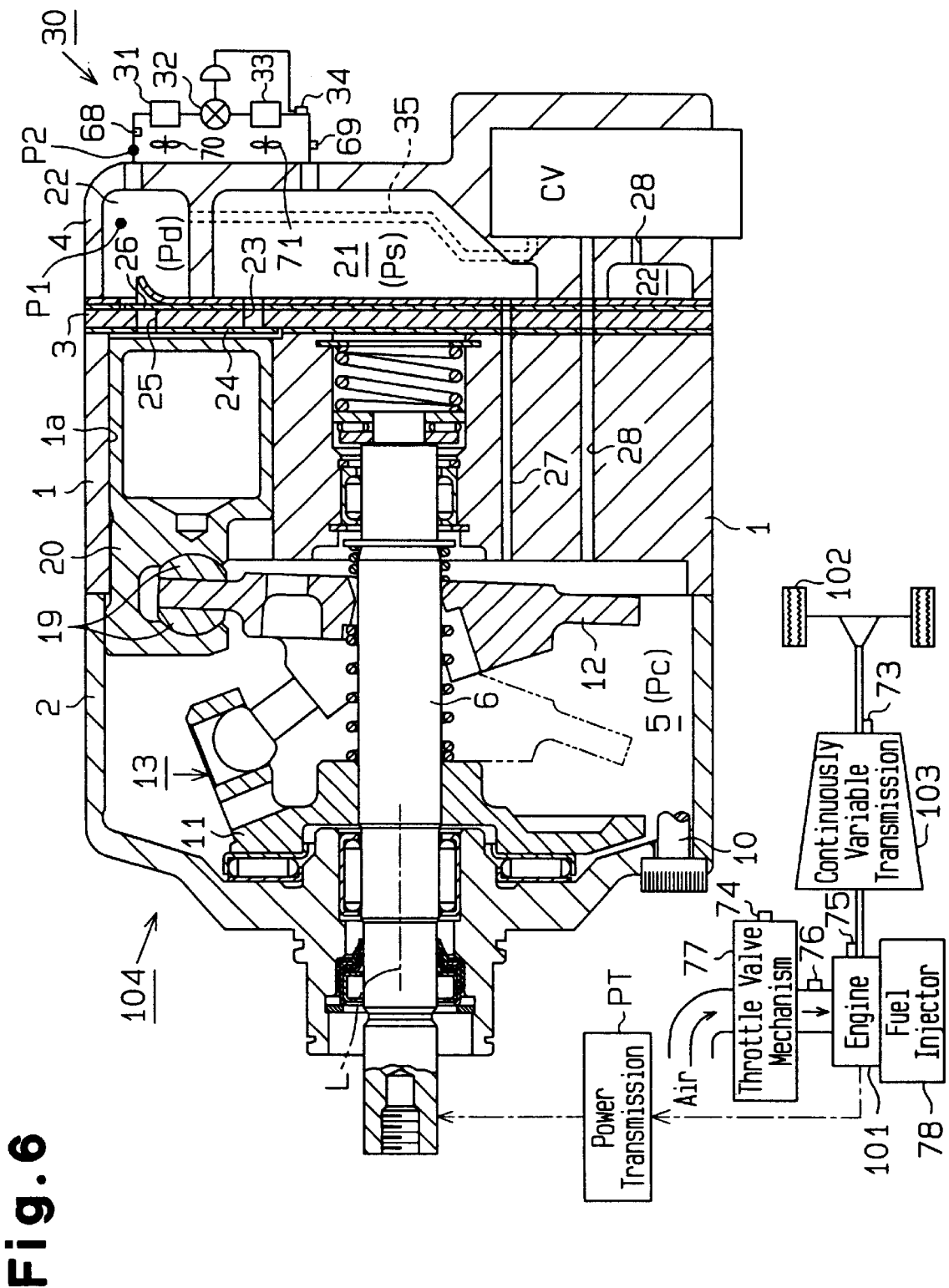
FIG. 6 shows a schematic diagram corresponding to FIG. 1 in the second embodiment in which two pressure monitoring points are provided.

In the embodiment of FIGS. 5 and 6, the first pressure monitoring point P1 may be located in a suction pressure region between the evaporator 33 and the suction chamber 21, and the second pressure monitoring point P2 may be located at downstream of the first pressure monitoring point P1 in the same suction pressure region.

In the embodiment of FIGS. 5 and 6, the first pressure monitoring point P1 may be located in a discharge pressure region between the discharge chamber 22 and the condenser 31, and the second pressure monitoring point P2 is located in a suction pressure region between the evaporator 33 and the suction chamber 21.

In the embodiment of FIGS. 5 and 6, the first pressure monitoring point P1 may be located in the discharge pressure region between the discharge chamber 22 and the condenser 31, and the second pressure monitoring point P2 may be located in the crank chamber 5. Alternatively, the first pressure monitoring point P1 may be located in the crank chamber 5, and the second pressure monitoring point P2 may be located in the suction pressure region between the evaporator 33 and the suction chamber 21. In essence, the respective pressure monitoring points P1, P2 are not limited to the location in a high pressure region or a low pressure region of the refrigerant passage. For example, the pressure monitoring points P1, P2 may be located in a refrigerant passage for controlling the displacement, positioned as a sub-circuit of the refrigerant circuit, i.e., in the crank chamber 5 as an intermediate pressure region within the supply passage 28, crank chamber 5 and bleed passage 27.

The present invention may be applied to a control valve of a type that changes a target discharge pressure. This control valve mechanically detects a discharge pressure Pd, and changes the discharge displacement of the compressor 104 so as to cancel variations in the detected discharge pressure Pd.

The present invention may be embodied in a vehicular air conditioning system which is equipped with a wobble type variable displacement compressor.

The E/G-ECU 63 may directly control an air conditioning control component other than the compressor 104 (the condenser fan 70 and the evaporator fan 71 illustrated in FIG. 2) in the air conditioning system.

Other than the continuous variable transmission, a vehicle control component except for a running power source and an air conditioner may be, for example, ABS (anti-lock brake system) and so on. A computer for controlling the ABS may be added to the on-board network as a node.

The running power source for the vehicle may be an electric motor, or a hybrid type source which uses a combination of an internal combustion engine and an electric motor.

It should be apparent to those skilled in the art that the present invention may be embodied in many other specific forms without departing from the spirit or scope of the invention. Particularly, it should be understood that the invention may be embodied in the following forms.

Therefore, the present examples and embodiments are to be considered as illustrative and not restrictive and the invention is not to be limited to the details given herein, but may be modified within the scope and equivalence of the appended claims.

What is claimed is:

1. A vehicle air conditioning apparatus including a refrigerant circuit, wherein the air conditioning apparatus is driven by a power source of a vehicle, the air conditioning apparatus comprising:
   a variable displacement compressor;
   an external information detector for detecting external information used for controlling the air conditioning apparatus;
   a first controller for controlling the output of the power source; and
   a second controller connected to the first controller via a communication line, wherein the second controller computes a target value of the displacement of the compressor based on the external information, wherein the second controller sends the computed target value to the first controller, and the first controller controls the displacement of the compressor based on the computed target value.

2. The apparatus according to claim 1, wherein the first controller judges whether the vehicle is in a displacement limiting drive mode, and if the vehicle is in the displacement limiting drive mode, the first controller minimizes the displacement of the compressor.

3. The apparatus according to claim 2, wherein an acceleration position sensor is connected to the first controller, wherein the sensor detects the degree of depression of an accelerator, wherein the first controller judges whether the vehicle is the displacement limiting drive mode based on at least the accelerator depression degree detected by the sensor.

4. The apparatus according to claim 1, wherein the first controller estimates a driving torque of the compressor based on the displacement of the compressor and controls the output of the power source based on the driving torque.

5. The apparatus according to claim 1 further comprising a fan used for the air conditioning, wherein the second controller controls the fan based on the external information detected by the external information detector.

6. The apparatus according to claim 1, wherein the compressor has a drive plate, a crank chamber, which accommodates the drive plate, and a control valve, which controls the pressure in the crank chamber, wherein the first controller controls the control valve to vary the inclination of the drive plate in accordance with the pressure in the crank chamber to vary the displacement of the compressor.

7. The apparatus according to claim 6, wherein the refrigerant circuit has a discharge pressure zone and a suction pressure zone, wherein the compressor has a supply passage, which connects the crank chamber to the discharge pressure zone, and a bleed passage, which connects the crank chamber to the suction pressure zone, the control valve comprising:

a valve body for adjusting the opening of the supply passage or the bleed passage;

a pressure sensing mechanism for mechanically detecting the pressure difference between two pressure monitoring points, which are located in the refrigerant circuit, wherein the pressure sensing mechanism moves the valve body such that the displacement is varied to counter changes of the detected pressure difference, wherein the first controller adjusts a force applied to the pressure sensing mechanism to determine a target value of the pressure difference.

8. The apparatus according to claim 1, wherein the communication line is a serial communication line, wherein the serial communication line transmits information between the first controller and the second controller.

9. The apparatus according to claim 8 further comprising a third controller, wherein the third controller controls a vehicle control apparatus, which is connected to the vehicle, wherein the first controller, the second controller and the third controller are connected to each other with the serial communication line.

10. An air conditioning apparatus including a refrigerant circuit that has a discharge pressure zone and a suction pressure zone, wherein the apparatus is driven by a power source, the apparatus comprising:

a variable displacement compressor, the compressor comprising:

a crank chamber;

a supply passage for connecting the crank chamber to the discharge pressure zone;

a bleed passage for connecting the crank chamber to the suction pressure zone; and a control valve for controlling the opening size of the supply passage or the bleed passage to vary the pressure in the crank chamber;

an external information detector for detecting external information used for controlling the air conditioning apparatus;

a first controller for controlling the output of the power source, wherein, when the power source is in a high-load state, the first controller judges whether a displacement limiting process is necessary to reduce the load; and a second controller connected to the first controller with a communication line, wherein the second controller computes a target value of the displacement of the compressor based on the external information and sends the computed target value to the first controller, wherein the first controller controls the displacement of the compressor based on the computed target value, and wherein the first controller minimizes the displacement of the compressor during the displacement limiting process.

11. A method for controlling a vehicle air conditioning apparatus including a refrigerant circuit, wherein the air conditioning apparatus is driven by a power source of a vehicle, the method including:

controlling the output of the power source by a first controller;

computing a target value of the displacement of a variable displacement compressor based on an external information used for controlling the air conditioning apparatus by a second controller connected to the first controller via a communication line;

sending the computed target value from the second controller to the first controller; and controlling the displacement of the compressor based on the computed target value by the first controller.

* * * * *

UNITED STATES PATENT AND TRADEMARK OFFICE
CERTIFICATE OF CORRECTION

PATENT NO.    : 6,481,225 B2
DATED         : November 19, 2002
INVENTOR(S)   : Kazuya, Kimura et al.

It is certified that error appears in the above-identified patent and that said Letters Patent is hereby corrected as shown below:

Column 4,
Lines 38-39, please change "A valve 30 housing 42" to -- A valve housing 42 --.

Column 5,
Line 4, please change "bore la is" to -- bore 1a is --.

Column 12,
Line 4, please change "permitted to more axially" to -- permitted to move axially --.

Signed and Sealed this

Fourth Day of March, 2003

JAMES E. ROGAN
*Director of the United States Patent and Trademark Office*